United States Patent Office

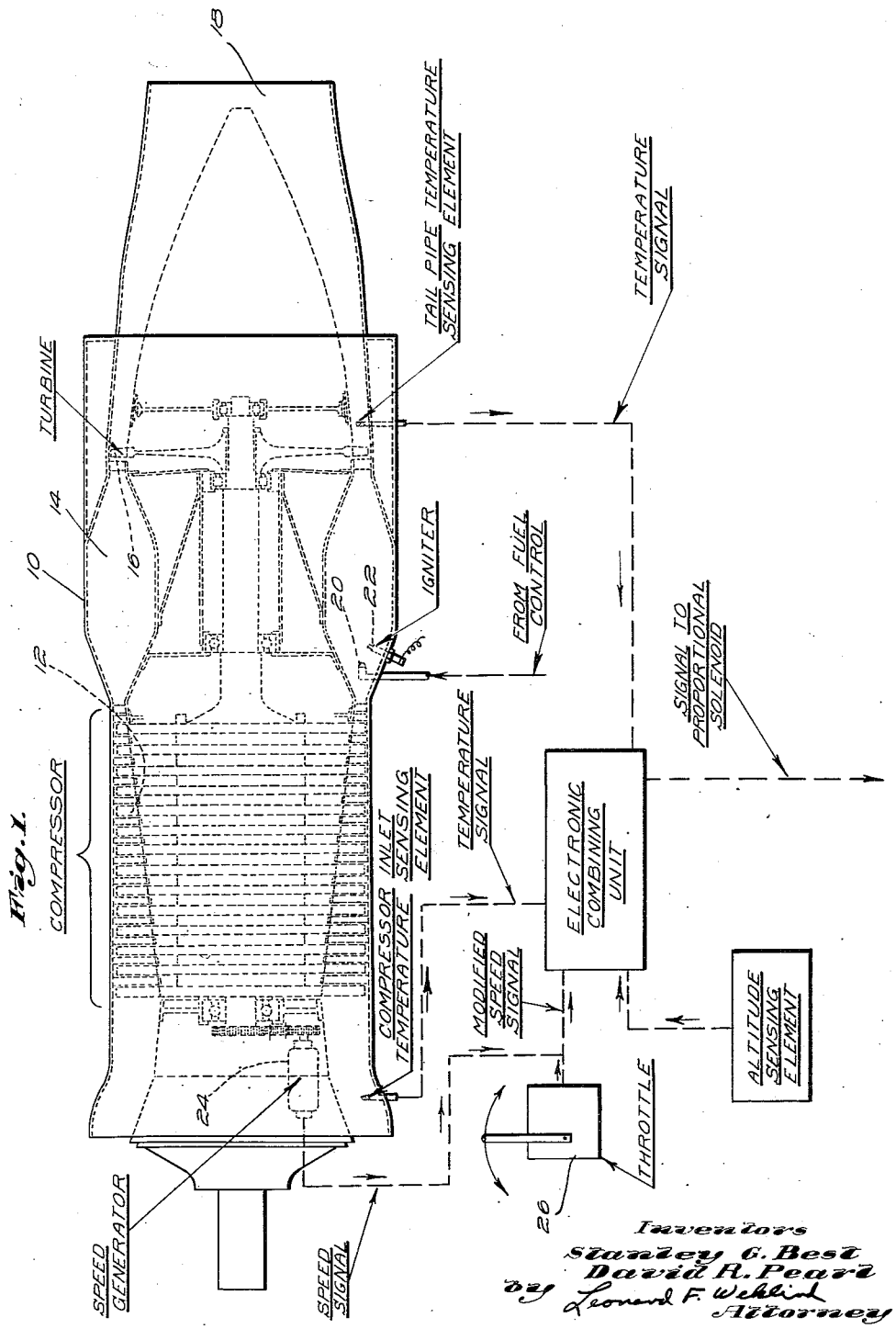

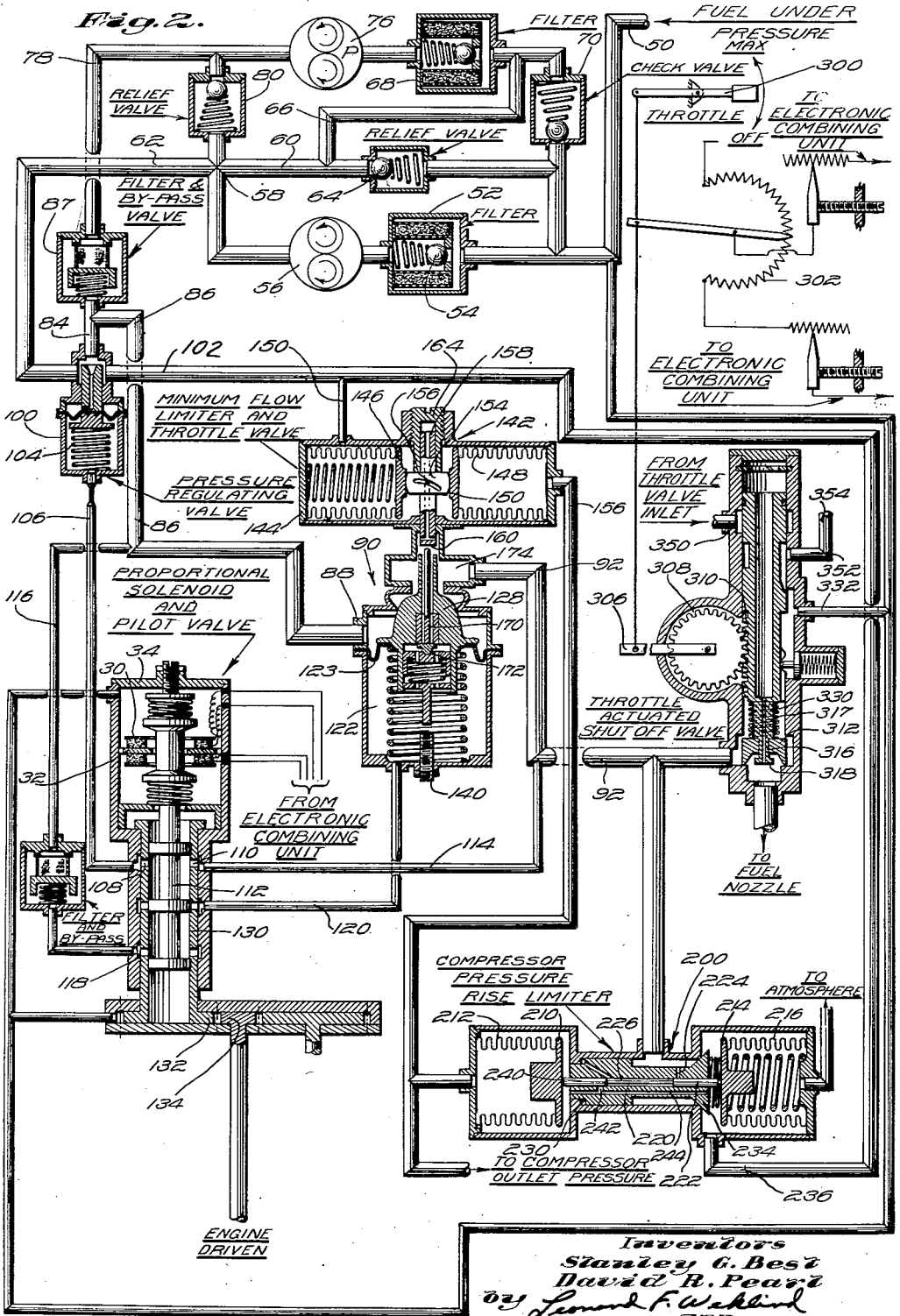

2,796,733
Patented June 25, 1957

2,796,733

TURBINE ENGINE FUEL CONTROL USING A FINAL ELECTRICAL SIGNAL FOR PROPORTIONALLY MOVING A SINGLE THROTTLE VALVE

David R. Pearl, West Hartford, and Stanley G. Best, Manchester, Conn., assignors to United Aircraft Corporation, East Hartford, Conn., a corporation of Delaware Application June 16, 1951, Serial No. 231,926

18 Claims. (Cl. 60—39.28)

This invention relates to fuel controls and more particularly to fuel control systems for gas turbine power plants.

It is a primary object of this invention to provide a fuel control system for gas turbine power plants which responds to a controlling signal to regulate fuel flow to the power plant in a manner which will become apparent from the following detailed description of the drawings in which:

Fig. 1 illustrates a cross section of a gas turbine power plant including a schematic diagram of a portion of the fuel control system.

Fig. 2 is a schematic illustration showing the major operative elements for the fuel control.

Referring to Fig. 1, a gas turbine power plant is illustrated at 10 having a compressor section 12, a burner section 14, a turbine 16 and an exhaust nozzle 18. Fuel from the fuel control unit is injected by means of one or more nozzles 20 into the burner section 14 and is ignited by any suitable means, as for example that shown at 22.

Several parameters of engine operation are measured and electronically combined so as to produce a controlling signal. Thus, as illustrated, a generator 24 produces a speed signal which is modified by the setting of the throttle unit 26 so that this modified speed signal is fed to the electronic combining unit. Other signals are also fed to this combining unit as for example signals corresponding to the compressor inlet temperature, exhaust pipe temperature and altitude. The electronic combining unit then produces a controlling signal which is led to the coils 30 and 32 (Fig. 2) of the proportional solenoid 34. The resulting influence of this controlling signal on the fuel control system will be described more clearly hereinafter.

As illustrated in Fig. 2, fuel is supplied from a suitable source to a main inlet line 50 where it enters the fuel regulating system. Initially the fuel flows through a filter 52 which includes a ball check by-pass 54 to insure fuel flow in the event that the filter should become excessively clogged. After passing through the filter 52 the fuel is increased in pressure by a pump 56 to some higher intermediate value. The fuel then passes to a T 58 which divides into two primary lines 60 and 62. The line 60 includes a relief valve 64 which maintains the fuel pressure at the above-mentioned intermediate value. The fuel then normally flows to the line 66 and through a second filter 68 which is similar to the filter 52. A check valve 70 communicates with the line 66 and is normally held closed due to the fact that the pressure in the line 66 is higher than that in the inlet line 50. The check valve 70 serves as a safety device in the event that the fuel pump 56 becomes inoperative in which case fuel entering the inlet line 50 will flow by the check valve 70 and then on through the filter 68.

A second high pressure pump 76 is provided adjacent the filter 68 so as to feed high pressure fuel to the main line 78 which also includes a relief valve 80 for limiting said high pressure to a predetermined maximum value. A filter and by-pass valve unit 87 is provided in line 78 as shown. The main line 78 branches off into two lines 84 and 86. Line 86 feeds fuel to the inlet 88 of a throttle valve 90 which meters the fuel and passes it to an outlet line 92 from whence it may pass to the combustion chamber fuel nozzles as will be seen hereinafter.

In order to properly control the fuel metering through the throttle valve 90 a fixed pressure drop is maintained across the throttle valve, i. e., between the inlet 88 and the outlet 92. This is accomplished as follows.

As was previously mentioned, the main fuel line 78 is divided into two lines 84 and 86 with the line 86 being fed to the throttle valve inlet 88. The line 84 leads to a pressure regulator 100 which produces a somewhat lower pressure in the line 102 but regulates the pressure in lines 84, 86 at a predetermined constant increment above pressure in line 92. The chamber 104 of the regulator is exposed to fuel pressure which is the equivalent of that at the outlet of the throttle valve 90. This is obtained by a line 106 which leads to the ports 108, 110 of a pilot valve 112 and then to the line 114 which connects with the outlet 92 from the throttle valve.

The pilot valve 112 controls the movements of throttle valve 90. A line 116 leads from the throttle valve inlet line 86 thru a filter and by-pass unit 87 to the port 118 of the pilot valve 110. The pilot valve in turn, which responds to the movements of the proportional solenoid 34, admits fluid from either port 110 or port 118 and permits it to flow through line 120 and into the chamber 122 of the throttle valve. Thus the movements of the pilot valve in either direction admits fuel at either of two pressures into the chamber 122 to control the movements of the main valve element 128 of the throttle valve. Thus, depending upon which of the pressures is communicated with the chamber 122, fuel is either admitted to or drained from the chamber 122. The spring force and the area of the diaphragm 123 as reacted upon by the fuel pressures on either side thereof provide the force for positioning the valve portion 128. The combination of the pilot valve and the throttle valve structure represents a single acting servo system for controlling the valve portion 128 and fuel flow. Since the chamber 122 of the throttle valve is regulated in this manner by pressures which are the equivalent of throttle valve inlet pressure or throttle valve outlet pressure, respectively, an accurate flow control is obtained. The throttle valve per se is described and claimed in copending patent application Serial No. 205,404, filed January 10, 1951, by Stanley G. Best et al., which matured into Patent No. 2,649,108 issued August 18, 1953.

The sleeve 130 surrounding the pilot valve may include a gear portion 132 at its lower extremity which is driven by a gear 134 connected to the engine. By thus rotating the sleeve 130, the pilot valve 112 when moved will be subject to moving friction rather than static friction so as to avoid sticking.

The throttle valve 90 includes an adjustable stop 140 which determines the maximum opening of the valve. A minimum opening stop, which is variable in response to certain operating conditions, is provided by the mechanism generally indicated at 142. This variable minimum flow stop comprises a spring biased evacuated bellows 144 which has a bearing plate 146 fixed to the movable end of the bellows 144. A second bellows 148 includes a movable wall or bearing 150 which works in opposition to the bellows 144 and its bearing plate 146. Compressor outlet pressure is led via a line 156 to the interior of the bellows 148. Fuel from the line 192 is led via a line 150 into the area surrounding both bellows 144 and 148 so as to dampen movements of the bearing plates 146 and 150.

The movement of plates 146 and 150 in either direction will tend to move a slotted cam member 154 which engages a pin 156 carried by a slidable piston 158. Hence, lateral movements of the cam element 154 will cause the piston 158 to move up and down to provide an adjustable abutment at 160 for the upper portion of the throttle valve element 128. A threaded sleeve 164 surrounds the upper portion of the piston 158 and retains the cam 154 against vertical motion so as to form an externally adjustable datum for the cam. The axial hole thru piston 158 provides balanced pressures on both ends of 158 so that variation of pressure in the chamber 174 (on the downstream side of throttle valve 90) will not operate the cam in reverse against the bellows and spring forces. In order to eliminate excessive pressure when the throttle valve element 128 is engaging the abutment 160, a pin 170 is provided centrally of the throttle valve element 128. This pin 170 tends to engage the abutment 160 before the valve element 128 reaches an engaged position with the abutment 160 so as to open a bleed valve 172 to drain pressure into the chamber 122 below the valve element 128 from the chamber 174 above the valve element 128.

Hence rather than having the valve portion 128 opposing the piston 158 with excessive force, in the event the valve portion 128 is being moved toward closed position and the piston 158 is being moved down, the bleed valve 172 will merely cause a shrinkage of volume in chamber 122.

From the foregoing it is apparent that the minimum opening of the throttle valve 90 will be regulated in response to absolute compressor outlet pressure in accordance with any predetermined schedule incorporated in the slope of cam 154. The variable minimum stop mechanism for the throttle valve is described and claimed in copending patent application Serial No. 232,569, filed June 20, 1951, by David R. Pearl, which matured into Patent No. 2,642,718, issued June 23, 1953.

In order to avoid excessive pressure rise across the compressor a pressure rise limiter generally indicated at 200 is provided to by-pass a portion of the fuel being fed to the fuel nozzles via the line 92. The avoidance of excessive pressure rise is desirable primarily from the standpoint of structural capacity of the compressor, i. e., to prevent the compressor from blowing up. The operation of the compressor pressure rise limiter is as follows.

The compressor pressure limiter is a positioning servo having a pilot valve actuated by a pair of bellows and the servo actuated by fuel pressure and returned by a spring. This limiter compares compressor outlet pressure with atmospheric pressure so that when the difference of these pressures reaches a predetermined level fuel flow to the power plant will be decreased. Thus compressor outlet pressure will operate against the movable wall 210 of the bellows 212 while atmospheric pressure will tend to operate the movable wall 214 of the bellows 216. When the pressure difference becomes excessive the wall 210 will move toward the right which in turn will cause the wall 214 to also move toward the right by means of the pin connection 220. Movement of the walls 210 and 214 toward the right will move the enlarged stem 222 to the right to uncover the bleed port 224; hence, the pin 220 and stem 222 serve as a pilot valve. This permits fuel to flow via the passage 226, which surrounds pin 220, into the chamber 230. The pressure in chamber 230 in turn moves the main valve element 234 to the right to permit fuel to flow outwardly through the line 236 back to the inlet of pump 76 thereby decreasing the amount of fuel flow to the engine. When the pressure rise across the compressor is reduced the movable wall 214 will move toward the left while also moving the enlarged stem 240 (adjacent the movable wall 210) so as to uncover port 242. The opening of the port 242 drains the chamber 230 via passage 244 out to the line 236. The draining of the chamber 230 will then permit the main valve element 234 to move to the left so as to cut off the further drainage of fuel from the line 92 leading to the engine.

The compressor pressure rise limiting mechanism is described and claimed in copending patent application Serial No. 238,537, filed July 25, 1951, by Stanley G. Best, which matured into Patent No. 2,694,290 issued November 16, 1954.

A throttle lever 300 is illustrated in Fig. 2 which lever is operatively connected to a potentiometer 302 which establishes the desired throttle setting signal to the electronic combining unit which is illustrated in Fig. 1. The throttle lever 300 also has a connection to a lever 306 which operates a gear 308 and a rack 310 of a shut-off valve 312 which is shown in its off position in Fig. 2. The purpose of the valve 312 is to provide a positive shut-off for the fuel from the fuel control system to the combustion chamber fuel nozzles. The rack 310 includes a depending stem 316 which includes a flange 318 which in turn engages the valve 312 when the rack 310 is moved upward. Due to the play between the flange 318 and the valve 312 the valve 312 will remain in its closed position until after the rack 310 has moved a predetermined distance in an upward direction. The play is provided so that in the event that the throttle control linkage is maladjusted in the off position of lever 300 the valve 312 will be positively forced against its seat by the spring 317.

As the valve 312 closes, fuel from the line 92 leading from throttle valve 90 will be bled off via passage 330 and the line 332 to the fuel inlet side of the fuel control system.

The upper portion of rack 310 includes a land which cooperates with ports 350 and 352. The port 352 leads to a dump valve system (not shown) for purging the fuel manifolds of fuel when the engine is stopped. Hence, when the throttle lever 300 is in the closed position the port 352 and its connecting line 354 are connected to a low source of pressure so that the dump valve (not shown) is open for draining the fuel from the engine manifold. Upon movement of the throttle lever 300 toward open position, the line 354 and port 332 are connected to a high source of fuel pressure via port 350 so as to close the dump valve.

Although only one embodiment of this invention has been shown and described herein, it will be apparent that various changes and modifications may be made in the construction and arrangement of the various parts without departing from the scope of this novel concept.

What it is desired to obtain by Letters Patent is:

1. In a fuel control system for a gas turbine power plant, the power plant having a compressor, a combustion section, a turbine for driving the compressor and an exhaust pipe, means responsive to a plurality of parameters of power plant operation including at least speed and an operating temperature for providing a controlling signal, a pilot valve movable in response to said controlling signal, means for supplying fuel to said combustion section including a throttle valve operatively connected to said pilot valve for regulating the flow of fuel, means for limiting the maximum and minimum openings of said throttle valve, and means responsive to the outlet pressure of said compressor for further regulating the flow of fuel from said throttle valve to said combustion chamber.

2. In a fuel control system for a gas turbine power plant, the power plant having a compressor, a combustion section, a turbine for driving the compressor and an exhaust pipe, means responsive to a plurality of parameters of power plant operation including at least speed and an operating temperature for providing a controlling signal, a pilot valve movable in response to said controlling signal, means for supplying fuel to said combustion section including a throttle valve operatively connected to said pilot valve for regulating the flow of fuel, and means responsive to the pressure rise across said compressor for further regulating the flow of fuel from said throttle valve to said combustion section, said last mentioned means including operative connections to the inlet side of said throttle valve.

3. In a fuel control system for a gas turbine power plant, the power plant having a compressor, a combustion section, a turbine for driving the compressor and an exhaust pipe, means responsive to a plurality of parameters of power plant operation for providing a controlling signal, a pilot valve movable in response to said controlling signal, a single acting servomotor operatively connected to said pilot valve, means for supplying fuel to said combustion section including a throttle valve operatively connected to said servomotor, means for limiting the maximum and minimum openings of said throttle valve, and means responsive to one parameter of engine operation for varying said limiting means for one of said openings, the variation of said limiting means being commensurate with the value of said parameter.

4. In a fuel control system for a gas turbine power plant, the power plant having a compressor, a combustion section, a turbine for driving the compressor and an exhaust pipe, means responsive to a plurality of parameters of power plant operation for providing a controlling signal, a pilot valve movable in response to said controlling signal, means for supplying fuel to said combustion section including a throttle valve operatively connected to said pilot valve, means for limiting the maximum and minimum openings of said throttle valve, means responsive to one parameter of engine operation for varying said limiting means for one of said openings, and means responsive to said one parameter for further regulating the flow of fuel from said throttle valve to said combustion section.

5. In a fuel control for a gas turbine power plant, the power plant comprising a compressor, a combustion chamber, a turbine for driving the compressor and an exhaust nozzle, means for supplying fuel to said combustion section including a throttle valve, means for maintaining a predetermined pressure drop across said throttle valve, valve means for controlling said throttle valve including operative connections thereto, means for limiting the minimum opening of said throttle valve, means responsive to the outlet pressure of said compressor for varying said limiting means, and means for regulating the flow of fuel from said throttle valve to said combustion chamber including mechanism responsive to the pressure rise across said compressor.

6. In a fuel control for a gas turbine power plant, the power plant comprising a compressor, a combustion chamber and a turbine for driving the compressor, means for supplying fuel to said combustion chamber including a throttle valve having inlet and outlet sides, means for maintaining a predetermined relationship between the inlet and outlet pressures of said throttle valve, and means for moving said throttle valve in fuel increasing and decreasing directions including a single acting fluid servo mechanism, said servo mechanism comprising a pilot valve for selectively utilizing said inlet and outlet pressure for moving said throttle valve throughout its range of operation and including operative connections to each of the respective sides of said throttle valve.

7. In a fuel control for a gas turbine power plant, the power plant comprising a compressor, a combustion chamber and a turbine for driving the compressor, means for supplying fuel to said combustion chamber including a throttle valve, means for maintaining a predetermined relationship between the inlet and outlet pressures of said throttle valve, means for moving said throttle valve in fuel increasing and decreasing directions including a fluid servo mechanism, said servo mechanism comprising a pilot valve for selectively utilizing said inlet and outlet pressure to control said throttle valve and including operative connections to said throttle valve, and means for regulating the flow of fuel from said throttle valve to said combustion chamber including mechanism responsive to the pressure rise across said compressor for by-passing a portion of the fuel flowing to said combustion chamber.

8. In a fuel control for a gas turbine power plant, the power plant comprising a compressor, a combustion chamber and a turbine for driving the compressor, means for supplying fuel to said combustion chamber including a throttle valve, means for maintaining a predetermined relationship between the inlet and outlet pressures of said throttle valve, means for moving said throttle valve in fuel increasing and decreasing directions including a fluid servo mechanism, said servo mechanism comprising a pilot valve for selectively utilizing said inlet and outlet pressure for moving said throttle valve and including operative connections to said throttle valve, means for limiting the minimum opening of said throttle valve including mechanism responsive to compressor outlet pressure, and means for by-passing a portion of the fuel flowing from said throttle valve to said combustion chamber, said by-passing means being responsive to the relationship between atmospheric and compressor outlet pressures.

9. In a fuel control according to claim 8 wherein said by-passing means comprises a pilot valve responsive to the difference in atmospheric and compressor outlet pressure and a servo mechanism controlled by said pilot valve, said by-passing means being operative to limit compressor pressure rise above a predetermined level.

10. In a fuel control for a gas turbine power plant, the power plant comprising a compressor, a combustion chamber and a turbine for driving the compressor, means for supplying fuel to said combustion chamber including a throttle valve, means for maintaining a predetermined relationship between the inlet and outlet pressures of said throttle valve, means for moving said throttle valve in fuel increasing and decreasing directions including a fluid servo mechanism, said servo mechanism comprising a pilot valve for selectively utilizing said inlet and outlet pressure to control said throttle valve and including operative connections to said throttle valve, and means for regulating the flow of fuel from said throttle valve to said combustion chamber including mechanism responsive to the pressure rise across said compressor for by-passing a portion of the fuel flowing to said combustion chamber, a shut-off valve for cutting off the flow of fuel from said throttle valve to said combustion chamber, and a drain, said shut-off valve including passages open when the valve is closed for connecting said throttle valve with said drain.

11. In a fuel control according to claim 10 wherein said shut-off valve includes a port open to one source of pressure when the valve is closed and open to another source of pressure when the valve is open.

12. In a fuel control for a gas turbine engine, the engine including a compressor, a combustion chamber and a turbine for driving the compressor, a source of fuel under pressure, means for supplying fuel from said source to said combustion chamber including a throttle valve movable in fuel increasing and decreasing directions, means for maintaining a predetermined relationship between the pressures at inlet and outlet of said throttle valve, means for moving said throttle valve including fluid responsive mechanism, a pilot valve for selectively directing said inlet and outlet pressures to said mechanism, means responsive to at least one parameter of engine operation for producing a controlling signal, means responsive to said signal for controlling said pilot valve, means for limiting the minimum opening of said throttle valve, means for varying said limiting means including mechanism responsive to absolute compressor outlet pressure, means for regulating the flow of fuel from said valve to said combustion chamber including means responsive to compressor outlet and atmospheric pressures for by-passing a portion of said fuel, means for manually cutting off the flow of fuel to said combustion chamber and operatively connected to the outlet of said throttle valve, and passage means open to said source of fuel when the valve is closed for returning fuel from said valve to said source.

13. In a fuel control for a gas turbine power plant, the power plant comprising a compressor, a combustion chamber and a turbine for driving the compressor, means for supplying fuel to said combustion chamber including a throttle valve, means for moving said throttle valve in fuel increasing and decreasing directions including a fluid servo mechanism, said servo mechanism comprising a pilot valve for selectively utilizing the inlet and outlet pressures of said throttle valve for moving said throttle valve and including operative connections to said throttle valve, means for variably limiting the minimum opening of said throttle valve, and means for by-passing a portion of the fuel flowing from said throttle valve to said combustion chamber.

14. In a fuel control for a gas turbine power plant, the power plant comprising a compressor, a combustion chamber and a turbine for driving the compressor, means for supplying fuel to said combustion chamber including a throttle valve, means for moving said throttle valve in fuel increasing and decreasing directions including a fluid servo mechanism, said servo mechanism comprising a pilot valve for selectively utilizing the inlet and outlet pressures of said throttle valve for moving said throttle valve and including operative connections to said throttle valve, means for variably limiting the minimum opening of said throttle valve, and means for by-passing a portion of the fuel flowing from said throttle valve to said combustion chamber, said by-passing means being responsive to the pressure at a predetermined point in the power plant.

15. In a power plant, a source of fuel under pressure, a conduit leading from said source to the power plant, a device for regulating the flow of fuel comprising a valve in said conduit, means for regulating the pressure drop immediately across said valve at a predetermined constant, a servomotor connected with said valve for actuating the valve, means connecting one side of said servomotor with the upstream side of said valve, means connecting said one side of said servomotor with the downstream side of said valve, a pilot valve in at least one of said connections, and means responsive to a power plant condition dependent upon the flow of fuel through the device for positioning said pilot valve.

16. In a power plant, a source of fuel, a conduit leading from said source to said power plant, a device for regulating the flow of fuel comprising a valve in said conduit, means for maintaining the pressure drop immediately across said valve at a predetermined constant, a servomotor operatively connected to said valve for actuating said valve, means connecting one side of said servomotor with the upstream side of said valve, means connecting said one side of said servomotor with the downstream side of said valve, a pilot valve in at least one of said connections, means responsive to an engine condition dependent upon the flow of fluid through said device for producing an electrical signal, and means responsive to the value and polarity of said signal for moving said pilot valve.

17. In a power plant, a source of fuel, a conduit leading from said source to the power plant, a device for regulating the flow of fuel comprising a valve in said conduit, a single acting servomotor connected with said valve for actuating said valve, means for maintaining the pressure drop across said valve at a predetermined constant, a pilot valve for selectively connecting one side of said servomotor with the fluid pressure immediately upstream and downstream sides of said fuel valve, and means responsive to a power plant condition dependent upon the flow of fuel through said device for positioning said pilot valve.

18. In a power plant according to claim 17 wherein said last mentioned means includes a proportional solenoid.

References Cited in the file of this patent

UNITED STATES PATENTS

| | | |
|---|---|---|
| 2,097,409 | Wertz | Oct. 26, 1937 |
| 2,349,727 | Hopkins | May 23, 1944 |
| 2,422,808 | Stokes | June 24, 1947 |
| 2,573,724 | Neal | Nov. 6, 1951 |
| 2,642,718 | Pearl | June 23, 1953 |
| 2,669,094 | Lee | Feb. 16, 1954 |
| 2,673,556 | Reggio | Mar. 30, 1954 |
| 2,688,229 | Lee | Sept. 7, 1954 |
| 2,707,866 | Noon et al. | May 10, 1955 |

FOREIGN PATENTS

| | | |
|---|---|---|
| 733,322 | Germany | Mar. 24, 1943 |